United States Patent [19]

Feins et al.

[11] 3,853,788

[45] Dec. 10, 1974

[54] PROCESS FOR HYDROTREATING CATALYST AND PRODUCT THEREBY

[75] Inventors: Irvin Ralph Feins, Westport; John Francis Lindsley, Stamford, both of Conn.

[73] Assignee: American Cynanamid Company, Stamford, Conn.

[22] Filed: Feb. 6, 1973

[21] Appl. No.: 330,166

[52] U.S. Cl............. 252/455 R, 252/458, 252/459, 252/465, 252/466 J
[51] Int. Cl.......................... B01j 11/40, B01j 11/32
[58] Field of Search........ 252/452, 458, 459, 455 R, 252/465

[56] References Cited
UNITED STATES PATENTS

| | | | |
|---|---|---|---|
| 2,983,691 | 5/1961 | Richardson | 252/453 |
| 3,751,380 | 8/1973 | O'Hara | 752/458 X |

*Primary Examiner*—C. Dees
*Attorney, Agent, or Firm*—William J. van Loo

[57] ABSTRACT

A process for an improved hydrodesulfurization catalyst comprising incorporation of a molybdenum in a washed alumina hydrogel which is then spray-dried, mix-mulled, extruded, dried and calcined, promoted with an aqueous urea-containing cobalt source, and activated.

10 Claims, No Drawings

PROCESS FOR HYDROTREATING CATALYST AND PRODUCT THEREBY

CROSS-REFERENCES TO RELATED APPLICATION

This application is related to applications Ser. No. 330,167, Ser. No. 330,168, and Ser. No. 330,169 all filed on even date herewith.

This invention relates to a process for preparing an improved hydrodesulfurization catalyst. More particularly, this invention relates to a process wherein a calcined, formed alumina support, obtained by a mixmuller procedure from a spray-dried alumina having a molybdenum source incorporated in the washed hydrogel, is promoted with an aqueous cobalt source containing urea and then activated.

In recent years, an increasing awareness of environmental pollution has become manifest, particularly with respect to air pollution. This awareness has, in turn, led to the recognition of pollution sources. A chief source of air pollution is the exhaust vapor emanating from internal combustion engines, i.e., automobiles. Much effort has been expended to control this pollutant, including legislation requiring reduced pollutant levels in exhaust vapor emanating from new cars. Although air pollution caused by cars has received considerable attention, air pollution by emissions from other sources has not been overlooked.

Significant contributors to air pollution are emissions which arise in the combustion of heating oils used in furnaces. Such emissions contain oxides of sulfur which are toxic and reactive. Sulfur arises in these oils as a result of its presence in the crude oil source. The increasing shortages of energy supplies have created an acute shortage of heating oils. To relieve this shortage, resort has been made to inferior sources of heating oils which have increased sulfur contents. Such resort can give rise to increased pollution problems unless catalytic treatment of the heating oil sources can reduce the sulfur content effectively. Recently, legislation has been enacted to limit the content of sulfur in heating oils to 0.3 percent. In a recent critical shortage of heating oils, a major supplier requested that the limit as to sulfur content be raised to 2.8 percent so as to relieve the shortage. Since the sulfur present in the heating oils is that which remains after catalytic treatment of the feed stocks from which heating oils are derived, a critical need for more active catalyst for treatment of feed stocks is apparent.

The feed stocks from which heating oils are derived are light catalytic cycle oils and light virgin gas oils which are generally used in admixture. The terms used to describe the feed stocks refer more specifically to the manner by which they arise and indicate their boiling range. Typically, the blend of feed stocks has a boiling range of about 240 –730°F., a gravity of about 28–32 in accordance with the method of reporting specified by the American Petroleum Industry, a basic nitrogen content of about 30–50 parts per million, and a sulfur content of about 1.3–1.5 weight percent. However, the current trend to secondary feed stocks has apparently resulted in a considerable increase in sulfur content. Because of the high sulfur content of the feed stock blend and the adverse levels of pollutants generated by combustion thereof, it is subjected to catalytic hydrotreatment, which reduces sulfur content, as well as basic nitrogen content so as to qualify the blend as an acceptable heating oil. The actual extent to which sulfur removal is effected will depend upon many factors, primarily the original sulfur content of the feed stock, the temperature at which treatment is effected, and the activity value of the catalyst employed in the hydrodesulfurization reaction. Although sulfur removal in the past was at the discretion of those converting feed stocks to heating oils, the recent legislation requires a high level of removal which is becoming increasingly difficult to achieve. Although easing of this requirement is sought by suppliers of heating oils, the increasing presence of air pollutants in the atmosphere would indicate a contrary trend.

The most widely used catalysts in the hydrodesulfurization reaction as it applies to heating oils are composites comprising cobalt oxide, molybdenum oxide and alumina, wherein alumina is the support carrying the other agents as promoters. Typically, such catalysts are effective in removing from about 70 percent to 90 percent of the sulfur present in primary feed stocks. However, such removal can still leave sulfur levels above current limitations, especially when secondary feed stocks are considered. Although the more active of current catalyst materials can provide the required sulfur removal in primary feed stocks, the temperature required for effecting such removal is higher than is desirable. In addition, to achieve the necessary sulfur removal, peak activity must be maintained over extended operating times and catalyst activity declines upon continued use, especially at high operating temperatures. The ever-decreasing availability of raw material sources and the ever-increasing shortage of heating oils have combined to make reliance upon secondary feed stocks essential and thus have complicated the problems of sulfur removal.

A number of conventional methods have been employed to prepare the catalyst composites useful in hydrotreating. A preferred procedure is to prepare a formed alumina support and thereafter impregnate the support with the desired levels of promoter sources. Upon activiation of the impregnated support, the catalyst composite is obtained. The particular procedures followed and specific materials employed, however, can greatly influence catalytic activity of the composite obtained.

An alternative procedure is disclosed in British Pat. Specification No. 1,220,105, published Jan 21, 1971 in the name of Stamicarbon, N.V. The process disclosed prepares a supported metal-containing catalyst by precipitating on a support the catalytically active material. The catalytic metal in the form of a soluble compound is prepared as a solution, said compound forming a precipitate on reaction with a hydroxyl ion. The support is added to the promoter solution to form a suspension. Hydroxyl ions by in situ generation are made available at a slow rate and under controlled agitation so that the precipitate is formed on the support and not in the body of the solution. Urea may be used as a source of hydroxyl ions by hydrolysis thereof.

In German Pat. No. 740,634, issued Oct. 25, 1943 to F. Stowenert, there is disclosed a process for preparing a catalyst by heating a solution of certain metal compounds that are precipitated in the presence of urea, the heating being carried out in the presence of a carrier to form an insoluble compound in or on said support.

In U.S. Pat. No. 3,637,529, issued Jan. 25, 1972 to Van Beek et al., there is disclosed a process for preparing a metallic catalytic agent by impregnating a carrier with an aqueous solution of a salt of the metallic catalytic agent and a source, upon heating in aqueous solution, of hydroxyl ions. The impregnated catalyst is then heated without substantial loss of water to precipitate the metallic catalytic agent on the carrier by the action of the hydroxyl ions generated by such heating. Urea may be used as the source of hydroxyl ions by hydrolysis thereof upon heating.

The processes of the cited patents require complicated precipitation steps that are tedious to preform and difficult to control, have special requirements as to useful materials, and lead to destruction or loss of considerable product.

Thus, there continues to exist the need for improved processes for preparing catalyst composites that avoid the aforementioned deficiencies and provide hydrocracking catalysts of greatly improved activity in hydrodesulfurization.

It would also be highly desirable if a new process which can provide greatly improved catalytic activity could also reduce pollutant emissions normally associated with catalyst preparations. Pollutant emissions arise from use of nitrate salts used in catalyst preparations. These materials are present on the catalyst in the form in which it is activated. Upon activation of the catalyst copious emissions of oxides of nitrogen arise and can give rise to air pollution. To minimize air pollution possibilities, it is necessary to install and maintain costly and bulky scrubbers for treatment of the emission arising from catalyst activation.

In accordance with the present invention, there is provided a process for preparing a hydrotreating catalyst which comprises: preparing a washed alumina hydrogel; slurrying said hydrogel in an aqueous solution of a molybdenum source so as to form a spray-dryer feed; spray-drying the feed thus formed to provide a powder; mix-mulling said powder to provide an extrudable paste; extruding the thus-formed paste; drying and calcining the extrudates; treating the calcined extrudates so as to furnish thereon a cobalt source and urea, said furnish providing an aqueous solution stable with respect to precipitation; dehydrating the thus-treated extrudates; and activating the dehydrated extrudates, the molybdenum source providing from about 8 to 20 weight percent molybdenum expressed as its oxide and the cobalt source providing from about 1 to 8 weight percent cobalt expressed as its oxide, said metal contents being based on the weight of the activated extrudates and said urea being present in said furnish in an amount providing at least 0.5 mole of urea per mole of cobalt therein.

The present invention offers a simplified process for preparing an improved hydrodesulfurization catalyst and offers many advantages. When sources of oxides of nitrogen are present in the catalyst being activated, the present process, by providing urea in the composite being processed converts such oxides to innocuous emissions. Furnish requirements as to cobalt-urea are met within the range used in pore saturation techniques, thus minimizing solution volume and mechanical handling of the extrudate. The combination of promoter sources and urea, as employed in the present invention, provides activated extrudates which exhibit sulfur removal activities that are significantly improved over those of prior art catalysts.

Certain of the results obtained by the present process are highly surprising and quite unexpected. Although urea was known to suppress oxides of nitrogen in unrelated areas, the fact that urea should also provide benefits in catalysts activity is highly surprising. The results as to catalytic activity are all the more surprising in view of the fact that no material changes in surface area and porosity from those of conventional catalysts are occasioned by use of urea in the present process. It is also surprising that urea provides greatly increased activity with cobalt-molybenum promoter combinations in the present process and fails to provide any increased activity with nickel-molybdenum combinations under identical processing.

In the present discussion, a carrier is a porous substrate or base upon which promoter materials are carried. Such substrates may be inactive or of limited activity in the catalytic reaction involved and the addition of promoter materials thereto imparts activity or improves activity with respect to the reaction. Promoter materials are substances which can be impregnated on the carrier and upon subsequent activation of the impregnated carrier will provide the active forms of the promoters, generally metals or metal oxides. A catalyst or catalyst material or composite consists of the carrier and the content of promoters.

Hydrotreating is a term used to denote that reduction in the presence of hydrogen is the catalyst process involved. Hydrodesulfurization is a term used to denote that sulfur is removed in a catalytic reaction with hydrogen. When sulfur removal is carried out on feed stocks for heating oils, it is effected by hydrodesulfurization. However, such feed stocks generally also contain nitrogen and it is generally removed coincidental to the sulfur removal. Thus, when both sulfur and nitrogen are removed the process is properly termed hydrotreating. When only sulfur is removed, the process is properly called hydrodesulfurization. In the present discussion, emphasis is placed on hydrodesulfurization since that is the primary concern.

In carrying out the process of the present invention, a washed hydrogel is first prepared. This may be prepared by precipitation from a water solution of a water-soluble aluminum compound which may be either an aluminum salt such as aluminum sulfate, aluminum nitrate, aluminum chloride or the like, or an alkali metal aluminate such as sodium or potassium aluminate. Typically, such alumina may be prepared in accordance with the description appearing in U.S. Pat. No. 2,980,632, issued Apr. 18, 1961 to Malley et al. According to the procedure set forth therein, an alumina precipitate is filtered and washed to reduce alkali metal and salt anions such as sulfate to acceptable levels, i.e., below 0.02 percent for alkali metal and 0.5 percent for sulfate or the like, and is thereafter spray-dried. The present process departs therefrom in that subsequent to washing but prior to spray-drying, a water-soluble molybdenum source is furnished to the slurry forming the spray-dryer feed so that the spray-dried powder will have the proper content of molybdenum therein. Suitable molybdenum sources include an ammonium molybdate such as ammonium dimolybdate, ammonium heptamolybdate, and the like, molybdic trioxide, phosphomolybdic acid, and the like. The amount of molybdenum source employed in the spray-dryer feed should be sufficient to provide from about 8 to 20 weight percent of molybdenum expressed as its oxide, based on the weight of the final activated extrudate obtained. Spray-drying is accomplished in accordance with conventional procedures.

After the spray-dried alumina powder is obtained it is processed directly to extrudates by the conventional mix-mullying techniques so as to obtain a calcined formed alumina support.

By "calcined formed alumina support," as that and similar expressions are used, herein, is meant a support in one of a number of particulate forms in which form the alumina is calcined. Preferably, such support is pelletized as by extruding or compression molding and is typically prepared as a pellet of 1/16 or 1/32 inch diameter. The alumina forming the support may be calcined prior to pelleting or may be calcined subsequent thereto, the important aspect being that the alumina be both formed and calcined prior to subsequent promoter treatment.

By "alumina support," as that and similar expressions are employed herein, is meant substantially pure alumina or alumina containing minor amounts, for example up to about 10 weight percent, of such known stabilizers as silica. Stabilizers such as silica may be incorporated into the alumina by addition of synthetic silica-alumina hydrogel cracking catalyst precursor in hydrogel form to precipitated alumina.

After the calcined formed alumina, i.e., extrudate, has been formed as indicated above, it is next treated so as to furnish thereon a cobalt source and urea, so that the furnish results in an aqeuous solution stable against precipitation. It is possible to prepare separate solutions of the materials to be furnished and add appropriate amounts thereof. It is also possible to combine the materials in a single solution as a furnish. It is generally preferred to furnish the materials required as aqueous solutions by spraying the support therewith, preferably by spraying a single solution of both materials, i.e., cobalt source and urea.

Suitable cobalt sources include cobalt nitrate, cobalt acetate, cobalt hydroxide, cobalt formate, and the like. The amount of cobalt source furnished should be sufficient to provide about 1 to 8 weight percent cobalt expressed as its oxide based on the weight of the final activated extrudate obtained. Urea is used in an amount which provides at least 0.5 mole of urea per mole of cobalt furnished.

After the support has been treated as described, dehydration of the support is next effected. No particular urgency is associated with dehydration and it may be deferred until convenient. Dehydration does not have to be carried out as a separate step but may be accomplished during composite warm-up in conjunction with the activation step. Whenever dehydration is contemplated as a separate step, however, it may be carried out at a temperature in the range of about 200°-500°F. for a time period suitable for the required water removal. Lower temperatures, i.e., down to ambient, may be used if no particular urgency for drying exists.

After treatment and any separate provision for dehydration contemplated are complete, the resultant support with its content of promoter source and urea, is subjected to activation, which consists of heat treatment. Heat treatment is generally referred to as calcination and consists of exposing the treated support to an elevated temperature for a specified time period, the combination temperature and time being adequate to convert the metal sources to the corresponding oxides. Generally, temperatures in the range of about 800° to 1300°F. are employed for time periods necessary to complete conversion. The calcination is carried out in a manner such that the catalyst material remains at the specified temperature for an hour or more, the time required to reach the temperature being additional. The specific heating schedule by which the catalyst material reaches the final temperature may vary widely and may be influenced by the particular equipment employed. The activation may be by means of a calciner, muffle furnace, rotary kiln, and similar devices which enable the desired temperature to be reached. In preferred instances, it is desirable to carry out the heating schedule in a staged manner, i.e., taking a specified time to reach a selected first intermediate temperature, again taking a specified time from the first intermediate temperature to reach a second intermediate temperature and so on until the final temperature is reached and held for a specified time. A particularly effective heating schedule is one following dehydration at about 220°F. for about 4 hours. The dehydrated treated support is placed in a calciner already heated to a temperature of about 390°F. The temperature of the calciner is then gradually raised over a 17 hour period to about 660°F. At the end of this time, the temperature of the calciner is rapidly raised to 1200°F. and the catalyst material is activated at this temperature for 1.5 hours.

After activation is complete, there is obtained a deep royal blue catalyst composite highly active in sulfur and basic nitrogen removal when used in processing feed stocks for heating oils.

The invention is more fully illustrated by the examples which follow wherein all parts and percentages are by weight unless otherwise specifically designated.

EXAMPLE 1

Part A: Preparation of A Silica Hydrogel

In a reactor tank containing 780 lbs. of water at 75°F. were added 245 lbs. of sodium silicate solution (28.7% $SiO_2$). There were then added 142 lbs. of a diluted sulfuric acid (37 lbs. 96% $H_2SO_4$ in 105 lbs $H_2O$) slowly, i.e. over about 10 minutes. There were then added 945 lbs. of water containing 0.5 lb. bone glue. The pH was adjusted to 3.5 with 28 percent aqueous ammonia and the slurry was filtered. After washing the filter cake with water, it was reslurried in water, the pH was adjusted to 6.3 with 28 percent aqueous ammonium and the slurry was again filtered and washed with water. The cake was then air dried and had a solids content of 6.5 percent.

Part B: Preparation of Alumina Hydrogel Containing Silica

In 480 lbs. of deionized water at 90°F. were slurried 27 lbs. of the silica hydrogel prepared above. Then 290 lbs. of alum solution (133 lbs. technical grade alum in 162 lbs $H_2O$), 198 lbs. of sodium aluminate solution (65% $Al_2O_3$), 50 lbs. of NaOH, and 69 lbs. of water were added. Both the alum and sodium aluminate solutions were added gradually, with the alum solution addition being completed before that of sodium aluminate. After completion of the sodium aluminate solution, the pH was 10.1. There were then added 2 lbs. of NaOH and 500 lbs. of water and slurry was filtered. The filter cake was washed with water and reslurried in water. The pH was then reduced to pH 7.0 with 70 percent nitric acid and aged 20 minutes. The aged slurry was filtered and washed with water. The cake obtained contained 13.2 percent solids.

Part C-Molybdenum Modification of Product of Part B

To 175 lbs. of the product of Part B was added a solution of 41 lbs. of $(NH_4)_2Mo_2O_7 \cdot 6H_2O$ in 8 lbs. of deionized water. The resulting slurry was then spray-dried under conventional conditions to obtain a powder of 70 percent solids. A small sample of the powder when calcined at 1100°F. for 1 hour had a pore volume of 1.17 cc/gram and an Apparent Bulk Density of 0.30 grams/cc.

Part D-Preparation of Extrudates

To a mix-muller were added 14.5 lbs. of the powder obtained in Part C above and 14 lbs of water. The pH was adjusted to 4.6 by the addition of 90 cc. of concentrated nitric acid (65%). After mulling to an extrudable consistency, the mixture was extruded a die of 0.073 inch diameter. The extrudates were dried at 250°F for 18 hours and then calcined at 1200°F. for 1 hour.

Part E-Promotion of Extrudates

In 250 cc. of hot (150°F) water were dissolved 53 grams of urea. 128 grams of $Co(NO_3)_2 \cdot 6H_2O$ were added to form a clear red solution. The solution was diluted to 390 cc. and sprayed onto 800 grams of the calcined extrudates of Part D. After tumbling for 15 minutes, the extrudates were dried overnight at 250°F. and then calcined at 1200°F for 1.25 hours. The calcined extrudates were predominately royal blue in color, had a content of 4% CoO, 12% $MoO_3$, 2% $SiO_2$, and balance $Al_2O_3$, and tested for hydrodesulfurization as a resid catalyst according to standard procedures. The relative sulfur removal activity volume basis was 200.

COMPARATIVE EXAMPLE

The procedures of Part A and Part B above were repeated.

Part C: Promoted Hydrogel of Part B

To 175 lbs of the product of B were added a solution of 4.1 parts of $(NH_4)_2Mo_2O_7 \cdot 6H_2O$ and 3.5 lbs of $Co(NO_3)_2 \cdot 6H_2O$ dissolved in 8 lbs of deionized water. The resulting slurry was then spray dried as in Part C of Example 1.

Part D: Preparation of Extrudates:

The procedure of Part D of Example 1 was followed. Since the extrudates already contain the promoters; no additional promotion is necessary. The extrudates had the composition 4% CoO, 12% $MoO_3$ 2% $SiO_2$ and balance $Al_2O_3$. The relative sulfur removal activity when tested as indicated in Example 1, Part E, was 100.

We claim:

1. A process for preparing a hydrotreating catalyst which comprises: preparing a washed alumina hydrogel; slurrying said hydrogel in an aqueous solution of a molybdenum source so as to form a spray-dryer feed; spray-drying the feed thus formed to provide a powder; mix-mulling said powder to provide an extrudable paste, extruding the thus-formed paste; drying and calcining the extrudates; treating the calcined extrudates so as to furnish thereon a cobalt source and urea, said furnish providing an aqueous solution stable with respect to precipitation; dehydrating the thus-treated extrudates; and activating the dehydrated extrudates, the molybdenum source providing from about 8 to 20 weight precent molybdenum expressed as its oxide and the cobalt source providing from about 1 to 8 weight percent cobalt expressed as its oxide, said metal contents being based on the weight of the activated extrudates and said urea being present in said furnish in an amount providing at least about 0.5 mole of urea per mole of cobalt therein.

2. The process of claim 1 wherein the molybdenum source is an ammonium molybdate.

3. The process of claim 2 wherein the ammonium molybdate is ammonium heptamolybdate.

4. The process of claim 1 wherein the alumina hydrogel is stabilized with silica.

5. The process of claim 1 wherein the calcined extrudates are treated with separate solutions of a cobalt source and urea.

6. The process of claim 1 wherein the calcined extrudates are treated with a combined solution of a cobalt source and urea.

7. The process of claim 6 wherein said cobalt source is cobalt nitrate.

8. The process of claim 1 wherein said cobalt source provides 4 weight percent cobalt expressed as its oxide and said molybdenum source provides 12 weight percent molybdenum expressed as its oxide.

9. The process of claim 1 wherein said dehydrating is carried out during composite warm-up in conjunction with activation.

10. A hydrotreating catalyst whenever obtained by the process of claim 1.

* * * * *